United States Patent
Cheon et al.

(10) Patent No.: US 8,972,225 B2
(45) Date of Patent: Mar. 3, 2015

(54) METHOD AND SYSTEM FOR CONSTRUCTING OPTIMIZED NETWORK SIMULATION ENVIRONMENT

(75) Inventors: Jaeyoung Cheon, Seoul (KR); Sang-il Lee, Seoul (KR); Byoung-In Cho, Seoul (KR)

(73) Assignee: Agency for Defense Development, Daejeon (KR)

( * ) Notice: Subject to any disclaimer, the term of this patent is extended or adjusted under 35 U.S.C. 154(b) by 318 days.

(21) Appl. No.: 13/431,284

(22) Filed: Mar. 27, 2012

(65) Prior Publication Data
US 2012/0253773 A1 Oct. 4, 2012

(30) Foreign Application Priority Data
Apr. 1, 2011 (KR) ........................ 10-2011-0030368

(51) Int. Cl.
*G06F 17/50* (2006.01)
*H04L 12/24* (2006.01)
*H04L 12/00* (2006.01)

(52) U.S. Cl.
CPC .......... *H04L 41/145* (2013.01); *H04L 41/0813* (2013.01)
USPC ................. 703/2; 703/14; 700/104; 700/110; 706/12; 706/13

(58) Field of Classification Search
USPC ........ 703/2, 14; 700/104, 110; 706/12, 13, 45
See application file for complete search history.

(56) References Cited

U.S. PATENT DOCUMENTS

| | | | |
|---|---|---|---|
| 8,078,552 B2 * | 12/2011 | Kaushal et al. | ................. 706/12 |
| 8,190,543 B2 * | 5/2012 | Kaushal et al. | ................. 706/45 |
| 2009/0228408 A1 * | 9/2009 | Kaushal et al. | ................. 706/12 |
| 2009/0240366 A1 * | 9/2009 | Kaushal et al. | ............... 700/110 |
| 2010/0138026 A1 * | 6/2010 | Kaushal et al. | ............... 700/104 |
| 2012/0209798 A1 * | 8/2012 | Kaushal et al. | ................. 706/13 |

OTHER PUBLICATIONS

Introduction to Using JCSS (formerly Netwars), Opnetwork, Opnet Technologies, Inc., 2008; 174 pages.
Creating JCSS (formerly Netwars) Device Models, Opnetwork, Opnet Technologies, Inc., 2008; 120 pages.
High Performance Simulation for Defense and R&D, Opnetwork, Opnet Technologies, Inc., 2006; 13 pages.

* cited by examiner

*Primary Examiner* — Thai Phan
(74) *Attorney, Agent, or Firm* — Harness, Dickey & Pierce, P.L.C.

(57) ABSTRACT

A method of constructing an optimized network simulation environment according to the present invention includes the steps of identifying communication equipment models for relaying a message to/from real equipments out of communication equipment models within a network model, as major models, calculating the order of abstraction priority for major models, performing batch-mode abstraction for non-major models, driving a simulation, determining whether a difference between a simulation execution time and an actual time spent is within an allowable delay value, performing adaptive abstraction for the major models, and evaluating a result of the simulation. If the method according to the present invention is used, a real-time simulation having fidelity and reliability for the function and operation of real equipments can be guaranteed.

8 Claims, 7 Drawing Sheets

| Equipment model name | Average frequency (cases/second) | Average necessary calculation time (seconds/case) | Order of low average frequency | Order of high average necessary calculation time | Order of priority of abstraction subject |
|---|---|---|---|---|---|
| Switch #12 | 473 | 0.005 | 3 | 3 | 3 |
| Router #54 | 98 | 0.5 | 2 | 1 | 2 |
| Gateway #132 | 12 | 0.1 | 1 | 2 | 1 |
| ... | ... | ... | ... | ... | ... |

FIG. 7

METHOD AND SYSTEM FOR CONSTRUCTING OPTIMIZED NETWORK SIMULATION ENVIRONMENT

CROSS-REFERENCE TO RELATED APPLICATION

This application claims the benefit of Korean Patent Application No. 10-2011-0030368 filed on Apr. 1, 2011, the entire disclosure of which is incorporated herein by reference.

BACKGROUND OF THE INVENTION

1. Field of the Invention

The present invention relates to a technical field for performing a network simulation while a network model is interworking with real equipments, more particularly, to a method of constructing an optimized network simulation environment which guarantees a real-time network simulation by synchronizing the operation time between the real equipments and the network model.

2. Background of the Related Art

As a conventional technique, there is an SITL (System In The Loop) in which real equipments interwork with a network model and an effect thereof is analyzed on a network simulation. An OPNET-series product, such as SITL, provides a function of setting a 'Real Time Execution Ratio' option in order to synchronize the actual time and the simulation time.

If the time taken to perform the simulation through the above function is shorter than the time actually taken, synchronization is maintained. If the time taken to perform the simulation is longer than the time actually taken, however, a problem will occur that synchronization is not maintained.

SUMMARY OF THE INVENTION

Accordingly, the present invention has been made in view of the above problem occurring in the prior art, and it is an object of the present invention to provide a method of constructing an optimized network simulation environment, which enables a real-time network simulation by simplifying the construction of a network model and lowering the fidelity of communication equipment models when the construction of the network model is complicated or when the necessary time taken to perform calculation for a network simulation is longer.

To achieve the above object, a method of constructing an optimized network simulation environment according to the present invention includes the steps of setting communication equipment models for relaying to/from real equipments out of communication equipment models of a network model, as major models, calculating the order of abstraction priority for the major models, performing batch-mode abstraction for non-major models, driving a simulation, determining whether a difference between a simulation execution time and an actual time spent is within an allowable delay value, performing adaptive abstraction for the major models, and evaluating a result of the simulation.

BRIEF DESCRIPTION OF THE DRAWINGS

Further objects and advantages of the invention can be more fully understood from the following detailed description taken in conjunction with the accompanying drawings in which.

DETAILED DESCRIPTION OF EMBODIMENTS

Some exemplary embodiments of the present invention will now be described in detail with reference to the accompanying drawings.

Figure 1:
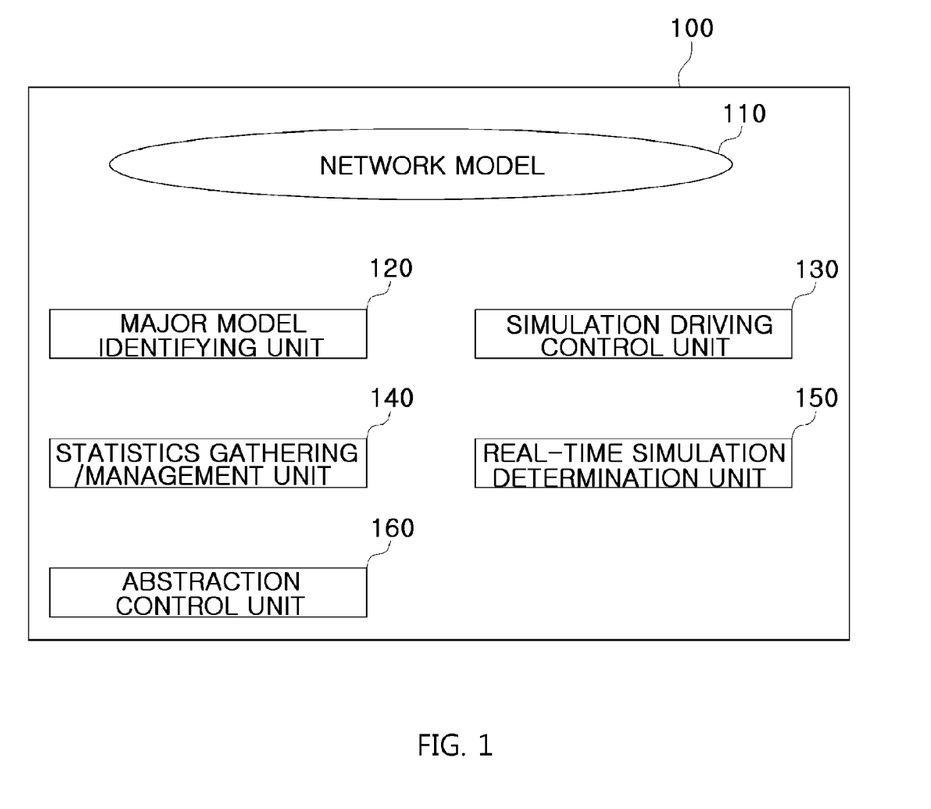
FIG. 1 shows the construction of a system for constructing an optimized network simulation environment according to the present invention.

FIG. 1 shows the construction of a system for constructing an optimized network simulation environment according to the present invention. As shown in FIG. 1, the system 100 for constructing an optimized network simulation environment according to the present invention includes a network model 110, a major model identifying unit 120, a simulation driving control unit 130, a statistics gathering/management unit 140, a real-time simulation determination unit 150, and an abstraction control unit 160. The network model 110 includes communication equipment models, link models and traffic models. The major model identifying unit 120 recognizes communication equipment model(s) for relaying a message to/from real equipments among the communication equipment models of the network models and identifies them as major model(s). The simulation driving control unit 130 controls the start, end, event processing and event reset of a simulation. The statistics gathering/management unit 140 gathers and manages necessary statistics from a major model. The real-time simulation determination unit 150 for determining whether a real-time simulation is being performed by comparing a simulation execution time and an actual time spent, and an abstraction control unit 160 for performing abstraction for the major models and non-major models.

Each of the elements is described in detail below.

First, the network model 110 includes the communication equipment models, link models and the traffic models, and can interwork with real equipments for the system for constructing an optimized network simulation environment according to the present invention. Furthermore, the major model identifying unit 120 sets a model for performing relaying a message to/from real equipments among the communication equipment models of the network model, as a major model and sets the remaining models as non-major models. Furthermore, the simulation driving control unit 130 controls resetting all simulation events, starting a simulation, performing a simulation with or without real equipments, and ending a simulation. Furthermore, the statistics gathering/management unit 140 gathers and manages statistics that will be used to determine adaptive abstraction during a simulation for only a model corresponding to a relay equipment model among the major models. Furthermore, the real-time simulation determination unit 150 determines whether a simulation is performed in real time by comparing a simulation time and an actual time spent and calculates the time taken due to delay and abstraction generated in a previous simulation cycle so that the time does not affect the check of the relevant cycle, so that all events can be performed within one simulation. Furthermore, the abstraction control unit 160 may perform abstraction for the major models and the non-major models. More particularly, the abstraction control unit 160 may perform abstraction for the non-major models at the same time and may perform adaptive abstraction for the major models in order to simplify the network model during a simulation.

Figure 2:
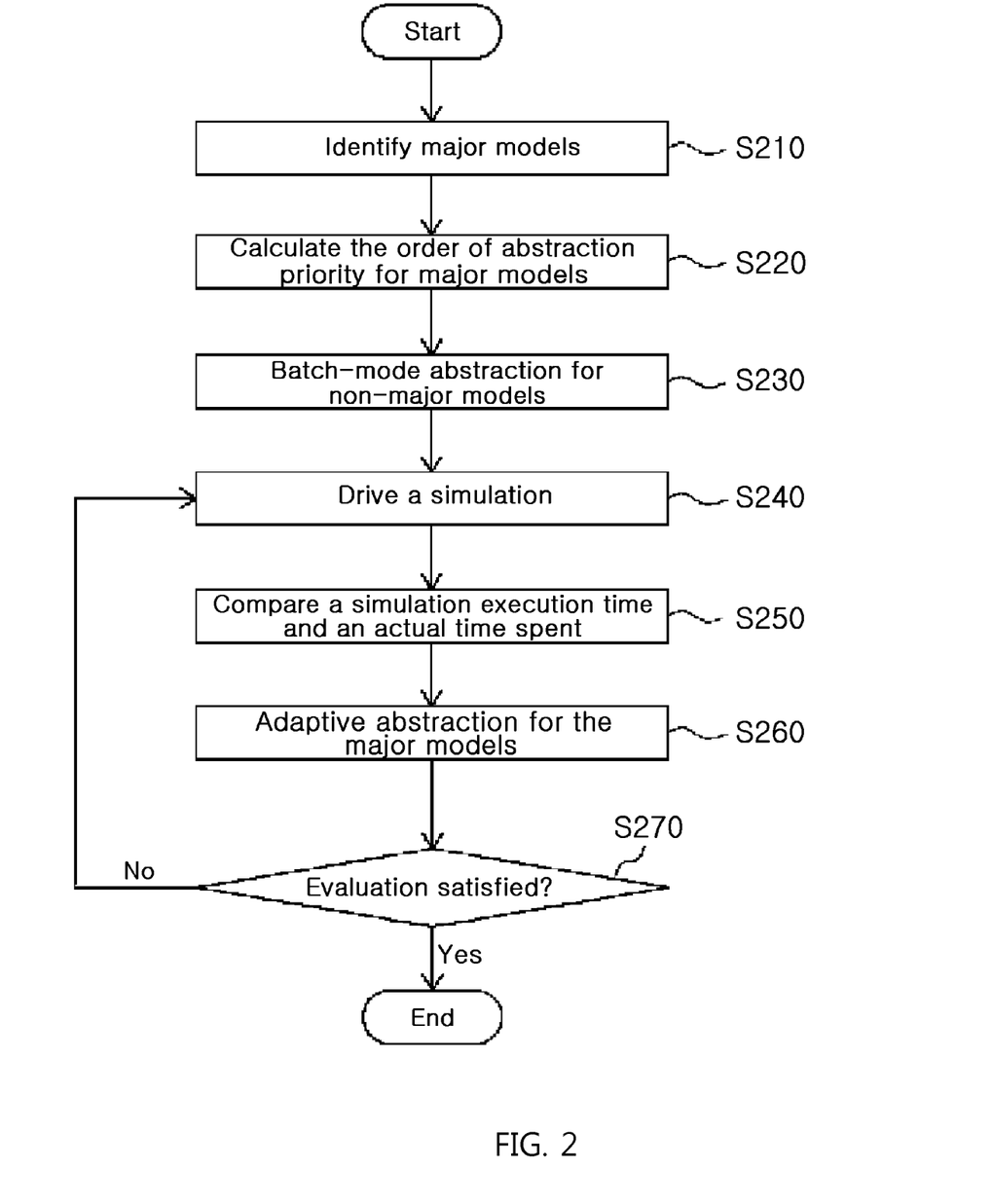
FIG. 2 is a schematic flowchart illustrating a method of constructing an optimized network simulation environment according to the present invention.

FIG. 2 is a schematic flowchart illustrating a method of constructing an optimized network simulation environment according to the present invention. As shown in FIG. 2, the method of constructing an optimized network simulation environment according to the present invention includes a) the step S210 of setting communication equipment models for relaying a message to/from real equipments out of communication equipment models of the network model 110, as major models, b) the step S220 of calculating the order of abstraction priority for the major models, c) the step S230 of performing batch-mode abstraction for non-major models, d) the step S240 of driving a simulation, e) the step S250 of determining whether a difference between a simulation execution time and an actual time spent is within an allowable delay value, f) the step S260 of performing adaptive abstraction for the major models, and g) the step S270 of evaluating a result of the simulation.

Each of the steps is described in detail below. First, in the step S210 of identifying major models, the major model identifying unit 120 recognizes the relay equipment models placed at several paths where data generated or received by pre-defined two terminal equipment models which represent real equipments is transmitted and received within the network model 110, and identifies them as major models. In order to set the major models, a constructive simulation may also be performed. Then, in the step S220 of calculating the order of abstraction priority for the major models, the statistics gathering/management unit 140 gathers and stores statistics (e.g., the frequency of transmission and reception per unit time and the necessary calculation time per unit event) for assigning the order of priority of the major models and computes the order of abstraction priority for the major models. Here, the frequency of transmission and reception per unit time is an index that is taken into account in order to determine how each major model is frequently used and may be represented by an average and a deviation. Furthermore, the necessary calculation time per unit event is for taking a calculation time, used to process data of the major models, into account and may be represented by an average and a deviation. In order to gather and store statistics of them, several constructive simulations may also be performed. The abstraction control unit 160 calculates the order of abstraction priority for major models using the statistics stored at the statistics gathering/management unit 140. In the step S230 of performing batch-mode abstraction, the abstraction control unit 160 identifies non-major models, and performs batch-mode abstraction for the identified non-major models. Next, in the step S240 of driving the simulation, the simulation driving control unit 130 resets discrete events for performing the simulation and starts the constructive simulation. Whenever the timing violation check cycle is reached while performing the simulation, the real-time simulation determination unit 150 performs the step S250 of determining whether the difference between a simulation execution time and an actual time spent is within an allowable delay value, the real-time simulation determination unit 150 compares the difference between a simulation execution time and an actual time spent with a preset allowable delay value so that the time taken owing to abstraction and a delay value generated in a previous simulation cycle do not affect the check of a current cycle. If a real-time simulation is violated because the difference is greater than the allowable delay value, the abstraction control unit 160 performs the step S260 of performing adaptive abstraction for the major models. Otherwise, the simulation driving control unit 130 continues performing the simulation. In the step of performing the adaptive abstraction, the real-time simulation determination unit 150 enables the abstraction control unit 160 to generate an abstraction option setting interrupt event in relevant major models on the basis of the order of abstraction priority for major models that have not been abstracted and to perform abstraction. The real-time simulation determination unit 150 stores accumulated difference time taken due to the delay and abstraction generated in a previous simulation cycle so that the time does not affect the check of the relevant cycle, so that all events can be performed within one simulation. After the above process is performed, the real-time simulation determination unit 150 performs the step S270 of evaluating a simulation result. Here, the real-time simulation determination unit 150 determines whether any real-time simulation violations exist. If, as a result of the determination, the number of real-time simulation violations exists, the real-time simulation determination unit 150 resets a simulation event and restarts the simulation from the step S240 with the abstracted network model. If, as a result of the determination, the real-time simulation violations do not exist, the process is terminated without restarting the simulation because it means that an abstracted network model guarantees a real-time simulation.

Figure 3:
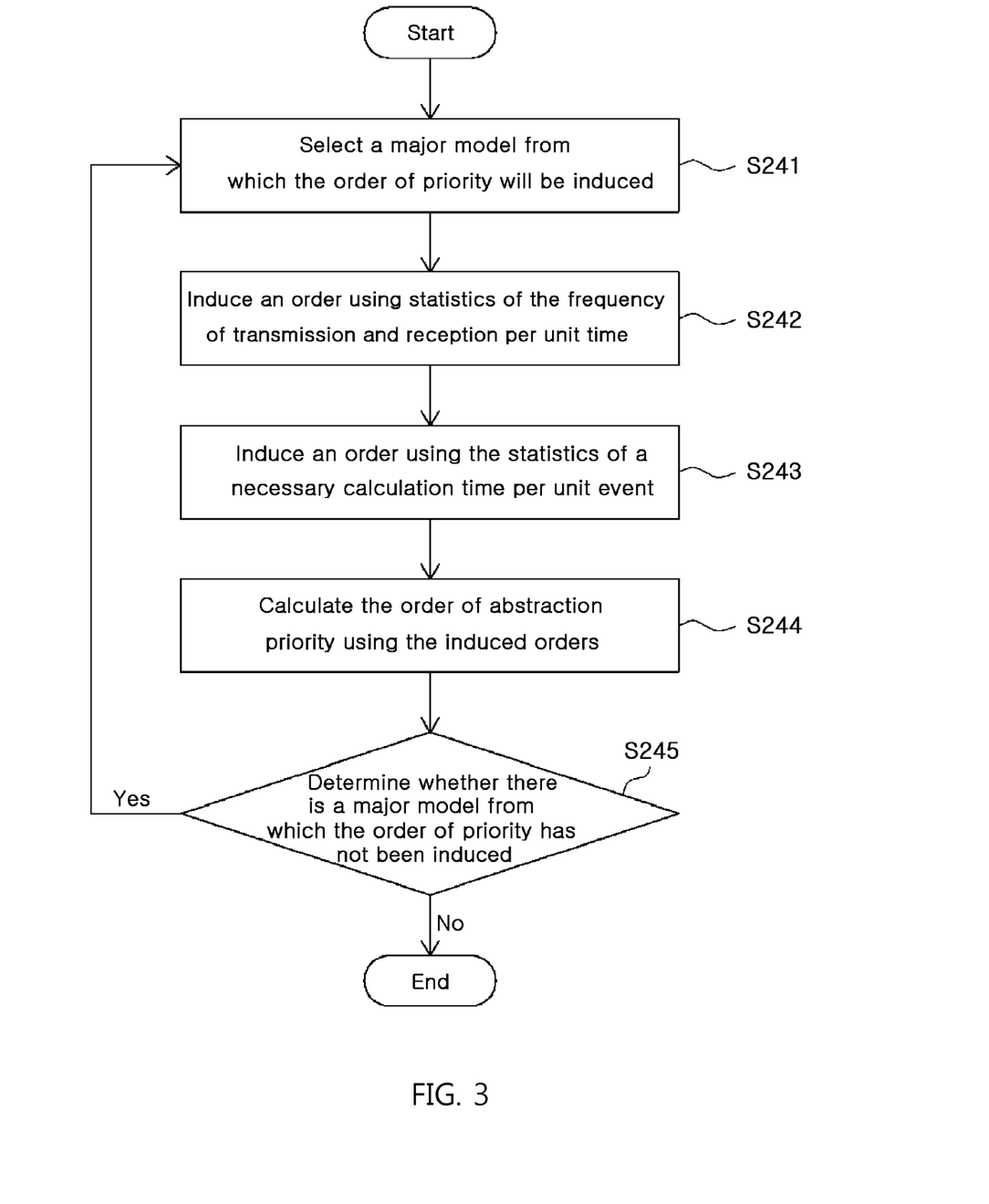
FIG. 3 is a flowchart illustrating a method of determining the order of abstraction priority according to the present invention.

FIG. 3 is a flowchart illustrating a method of determining the order of abstraction priority according to the present invention. As shown in FIG. 3, the method of determining the order of abstraction priority according to the present invention includes the step S241 of selecting a major model from which the order of priority will be induced, the step S242 of inducing the order using the statistics of the frequency of transmission and reception per unit time, the step S243 of inducing the order using the statistics of a necessary calculation time per unit event, the step S244 of calculating the order of abstraction priority using the induced orders, and the step S245 of determining whether there is other major models from which the order of priority has not been induced.

Each of the steps is described in detail below. First, in the step S241 of selecting a major model, a major model is selected out of the major models from which the order of priority will be induced. Particularly, the major model is arbitrarily selected out of the major models for which the order of priority has not yet been determined. Next, in the step S242 of inducing an order using the statistics of the frequency of transmission and reception per unit time, the order of priority is determined in ascending order from a major model having low frequency on the basis of the statistics of the frequency of transmission and reception per unit time between the major models that are now in question and the major model(s) for which the order of priority has been determined. Furthermore, in the step S243 of inducing the order using the statistics of the necessary calculation time per unit event, the order of priority is determined in ascending order from a major model having a greater necessary time on the basis of the statistics of a necessary calculation time per unit event between the major model that is presently the subject and the major models for which the order of priority has been determined. Furthermore, in the step S244 of calculating the order of abstraction priority using the induced orders, the order of priority of the subject to be abstracted is determined by combining the induced frequency and the order of priority according to the time. Here, the order of priority of the subject to be abstracted may be determined by giving a prescribed weight to the frequency and the time. Finally, in the step S245 of determining whether there is a major model for which the order of priority has not been induced, if, as a result of the determination, there is a major model for which the order of priority has not been induced, the process is repeated from the step S241 of selecting a major model for which the order of priority will be induced. If, as a result of the determination, a major model for which the order of priority has not been induced does not exist, the process of determining the order of abstraction priority is terminated.

Figure 4:
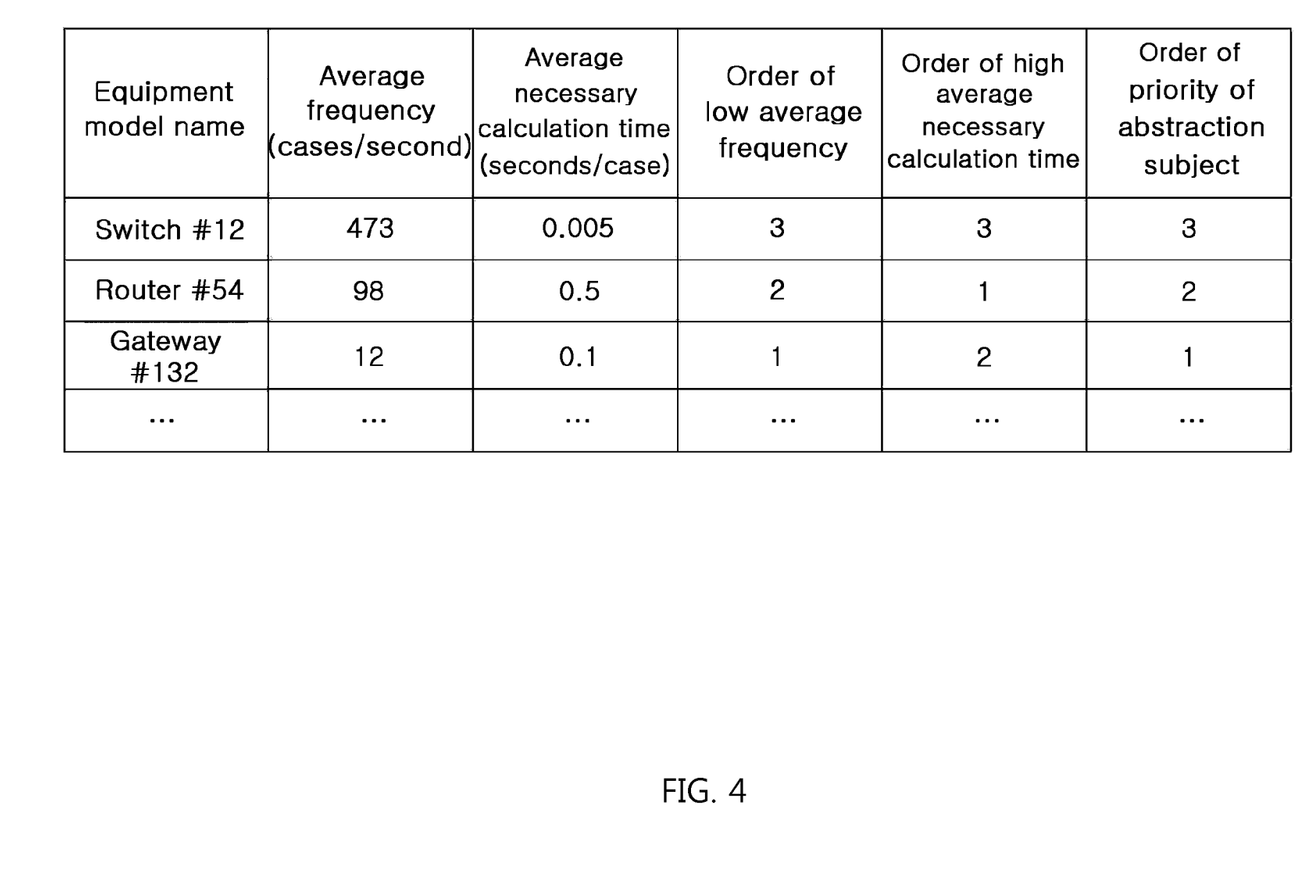
FIG. 4 shows an embodiment of a determination table through the method of determining the order of abstraction priority according to the present invention.

An embodiment of a determination table through the method of determining the order of abstraction priority according to the present invention is shown in FIG. 4.

Figure 5:
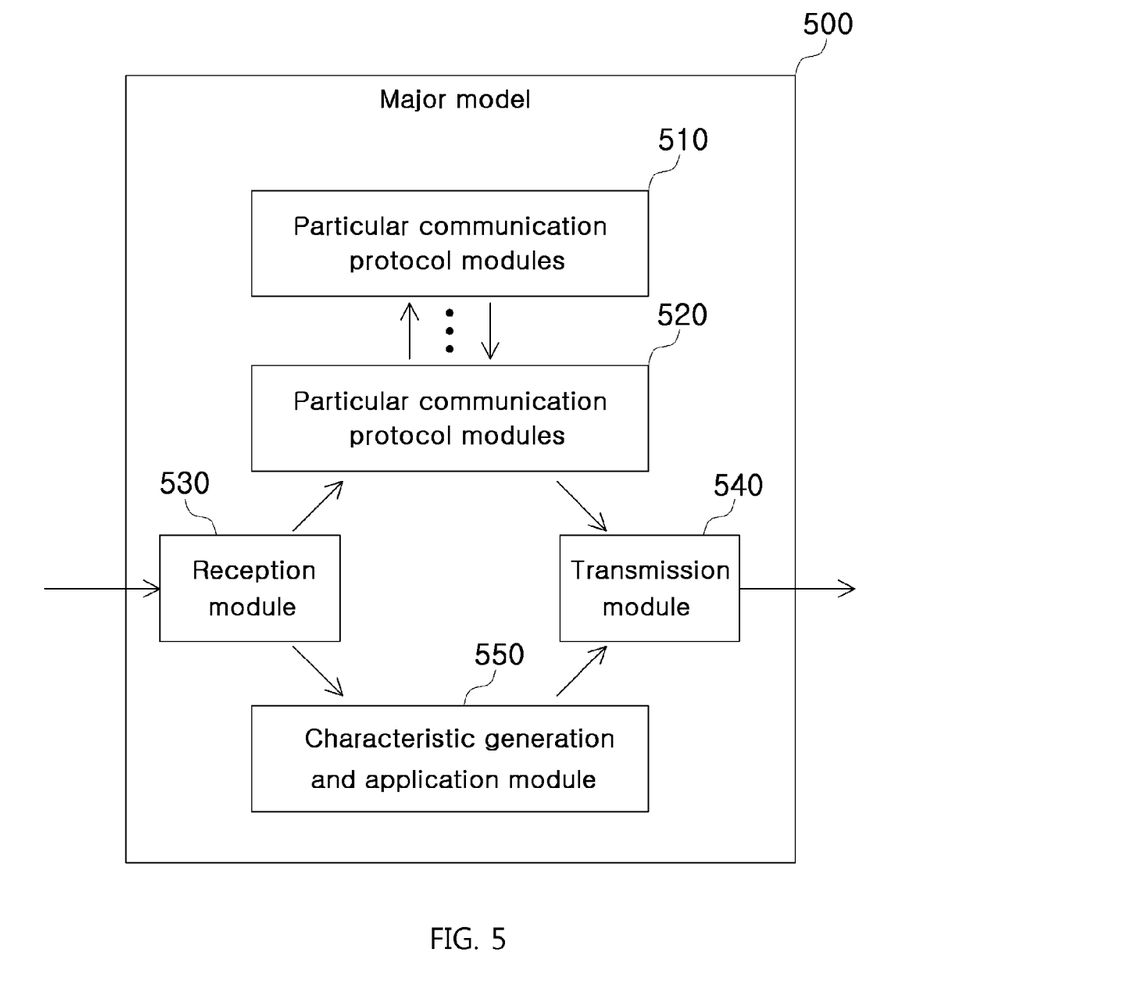
FIG. 5 is a block diagram of a major model according to the present invention.
Figure 6:
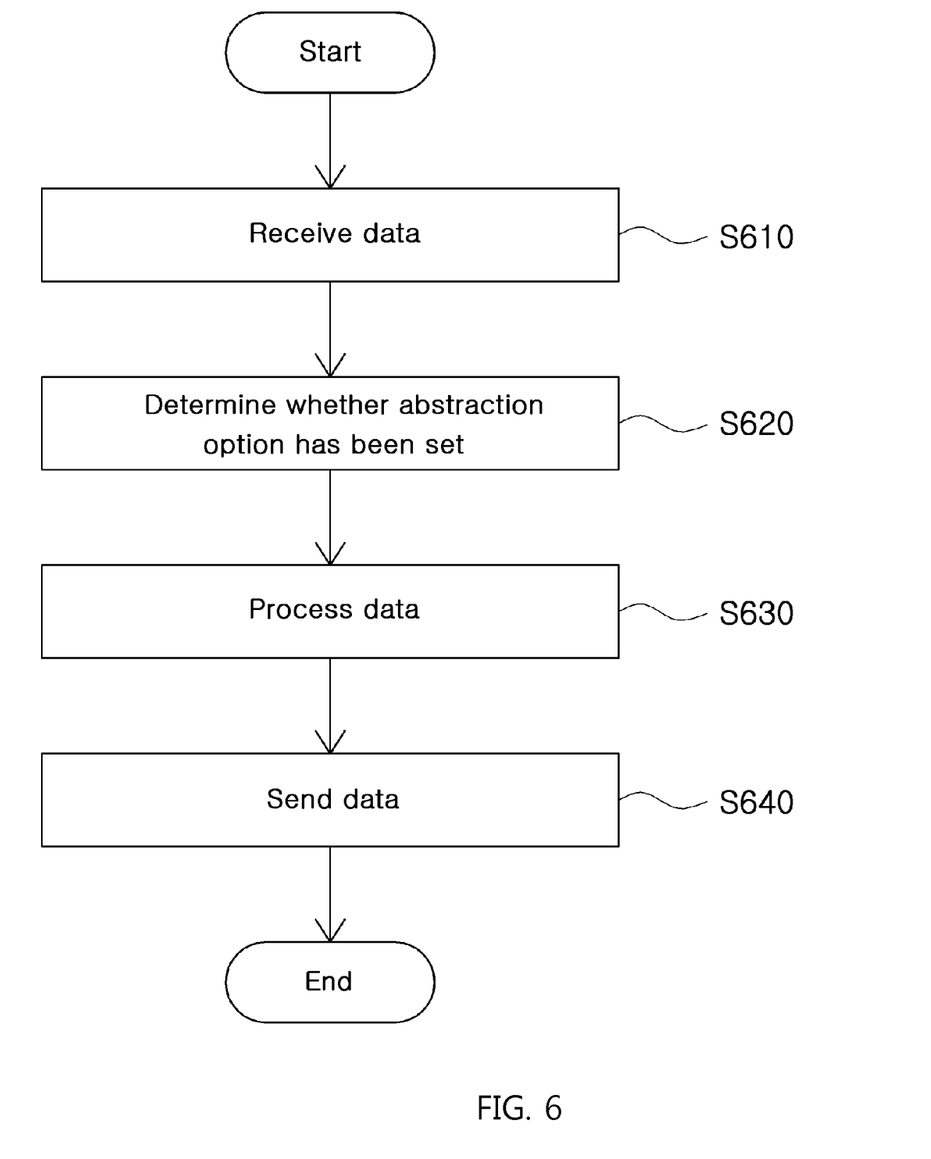
FIG. 6 is a flowchart illustrating an adaptive abstraction method for a major model according to the present invention.

FIG. 5 is a block diagram of a major model according to the present invention, and FIG. 6 is a flowchart illustrating an adaptive abstraction method for a major model according to the present invention.

As shown in FIG. 5, the major model 500 according to the present invention includes particular communication protocol modules 510 and 520, a reception module 530, a transmission module 540, and a characteristic generation and application module 550.

The adaptive abstraction method for a major model according to the present invention is described with reference to FIGS. 5 and 6. The abstraction control unit 160 according to the present invention performs adaptive abstraction for the major model 500. As shown in FIG. 6, the method of adaptively performing abstraction for the major model 500 according to the present invention includes the step S610 of receiving data at the major model 500, the step S620 of determining whether an abstraction option of the major model 500 has been set, the step S630 of processing the received data in the major model 500, and the step S640 of sending the processed data from the major model 500.

Each of the steps is described in detail below. In the step S610 of receiving data at the major model 500, the major model 500 receives data from other communication equipment models. Next, the step S620 of determining whether an abstraction option of the major model 500 has been set is performed. In the step S630 of processing the received data, if the abstraction option has been set, the characteristic generation and application module 550 of the major model 500 processes the data on the basis of statistics which are stored in the abstraction control unit 160 at the step S220 of calculating the order of abstraction priority for major models. If the abstraction option has not been set, the particular communication protocol module of the major model 500 processes the data. Furthermore, in the step S640 of sending the processed data, the transmission module 540 of the major model 500 sends the processed data to other communication equipment models, thereby terminating data relay.

Figure 7:
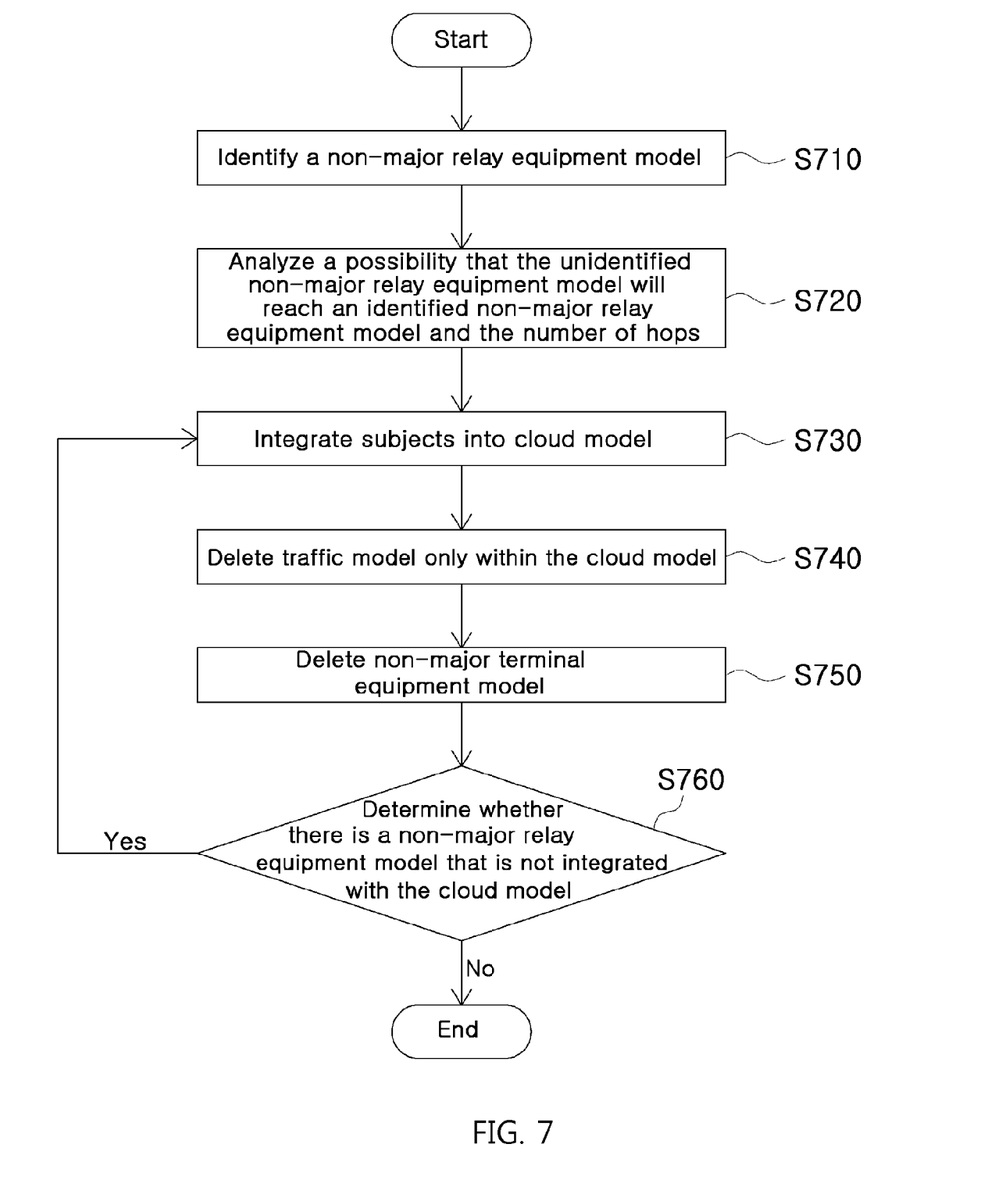
FIG. 7 is a flowchart illustrating an embodiment of the batch-mode abstraction method of a non-major model according to the present invention.

FIG. 7 is a flowchart illustrating an embodiment of the batch-mode abstraction method of a non-major model according to the present invention. As shown in FIG. 7, the batch-mode abstraction method of the non-major model according to the present invention includes the step S710 of identifying non-major relay equipment models, the step S720 of analyzing a possibility that each unidentified non-major relay equipment model will reach any identified non-major relay equipment model(s) and the number of hops, the step S730 of selecting unidentified relay equipment models for one identified non-major relay equipment model and integrating them into one cloud model, the step S740 of deleting the traffic models of which data is transmitted and received only within the cloud model, the step S750 of deleting the non-major terminal equipment models that transmit and receive the traffic only within the cloud model, and the step S760 of determining whether there is a non-major relay equipment model that is not integrated with the cloud model.

Each of the steps is described in detail below. First, in the step S710 of identifying a non-major relay equipment model, a major model identification unit identifies the non-major relay equipment models directly connected to the major model on the basis of a list of already identified major models. Next, the step S720 of analyzing a possibility that each unidentified non-major relay equipment model will reach any identified non-major relay equipment model and the number of hops is performed. Next, the step S730 of selecting unidentified relay equipment models for one identified non-major relay equipment model by referencing above-mentioned possibility and the number of hops, and integrating them into one cloud model is performed. Here, it is preferred that the subjects to be integrated can be reached from an identified non-major relay equipment model and have the number of hops smaller than that of any other identified non-major relay equipment model. Next, in the step S740 of deleting the traffic models of which data is transmitted and received only within the cloud model, and in the step S750 of deleting the non-major terminal equipment models that transmit and receive the traffic only within the cloud model, the abstraction control unit 160 deletes the traffic models not affecting the major models, deletes the terminal equipment models having only the deleted traffic models, and deletes link models connected to the deleted terminal equipment models. Finally, in the step S760 of determining whether there is a non-major relay equipment model that is not integrated with the cloud model, it is determined whether there is a non-major relay equipment model which is not integrated with the cloud model, among the non-major relay equipment models directly connected to the major models. If, as a result of the determination, there is a model which is not integrated with the cloud model, the process is repeated from the step S730 of integrating the subjects into the cloud model. If, as a result of the determination, there is no model which is not integrated with the cloud model, the process of integrating the non-major models with the cloud abstraction model is terminated.

As described above, if the method of constructing an optimized network simulation environment according to the present invention is used, a real-time simulation having fidelity and reliability for the function and operation of actual equipment can be guaranteed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of constructing an optimized network simulation environment, the method comprising the steps of:
   a) setting communication equipment models for relaying a message to/from real equipments out of communication equipment models of a network model, as major models;
   b) calculating the order of abstraction priority for the major models;
   c) performing batch-mode abstraction for non-major models;
   d) driving a simulation;

e) determining whether a difference between a simulation execution time and an actual time spent is within an allowable delay value;
f) performing adaptive abstraction for the major models; and
g) evaluating a result of the simulation.

2. The method as claimed in claim 1, wherein the step c) of performing batch-mode abstraction for non-major models comprises the steps of:
identifying the non-major models;
analyzing a possibility that each unidentified non-major relay equipment model will reach any identified non-major relay equipment model, and the number of hops;
selecting unidentified non-major relay equipment models for one identified non-major relay equipment model and integrating the unidentified non-major relay equipment models into one cloud model;
deleting the traffic models of which data is transmitted and received only within the cloud model;
deleting the non-major terminal equipment models that transmit and receive only within the cloud model; and
determining whether there is any non-major relay equipment model which is not integrated with the cloud model.

3. The method as claimed in claim 1, wherein the step of calculating the order of abstraction priority for the major models comprises the steps of:
selecting the major models from which the order of priority will be induced;
inducing an order using statistics of a frequency of transmission and reception per unit time;
inducing an order using statistics of a necessary calculation time per unit event;
calculating the order of abstraction priority using the induced orders; and
determining whether there is any major model from which the order of priority has not been induced.

4. The method as claimed in claim 1, wherein the step e) of determining whether a difference between a simulation execution time and an actual time spent is within an allowable delay value comprises the step of:
accumulating and storing the difference if the difference is greater than the allowable delay value.

5. The method as claimed in claim 1, wherein:
the step f) of performing adaptive abstraction for the major models is performed when the difference is greater than the allowable delay value, and
the step f) of performing adaptive abstraction for the major models comprises the steps of:
receiving data at the major model;
determining whether an abstraction option of the major model has been set;
processing the received data in the major model; and
sending the processed data from the major model.

6. The method as claimed in claim 1, wherein the step g) of evaluating a result of the simulation comprises the steps of:
determining whether real-time simulation violations exist;
restarting the simulation from the step d) if real-time simulation violations exist; and
terminating the process without restarting the simulation if real-time simulation violations do not exist.

7. A system for constructing an optimized network simulation environment, the system comprising:
a network model including communication equipment models, link models and traffic models;
a major model identifying unit for identifying communication equipment models for relaying a message to/from real equipments among the communication equipment models of the network model, as major models;
a simulation driving control unit for controlling a start, end, event processing, and event reset of a simulation;
a statistics gathering/management unit for gathering and managing necessary statistics from the major models;
a real-time simulation determination unit for determining whether a real-time simulation is being performed by comparing a simulation execution time and an actual time spent; and
an abstraction control unit for performing abstraction for the major models and non-major models.

8. The system as claimed in claim 7, wherein the major model includes particular communication protocol modules, a reception module, a transmission module, and a characteristic generation and application module.

* * * * *